United States Patent Office 3,574,712
Patented Apr. 13, 1971

3,574,712
PREPARATION OF ESTERS
Herman S. Bloch, Skokie, and Louis Schmerling, Riverside, Ill., assignors to Universal Oil Products Company, Des Plaines, Ill.
No Drawing. Filed Dec. 11, 1967, Ser. No. 689,263
Int. Cl. C07c 69/14, 69/50, 69/82
U.S. Cl. 260—485                                    10 Claims

ABSTRACT OF THE DISCLOSURE

Esters of carboxylic acids are prepared in a cyclic process by reacting a saturated hydrocarbon and the corresponding alkyl metaborate with an oxygen-containing gas to form a dialkyl borate which is then divided into two equal portions. One portion is treated with carboxylic acid and water to yield the desired ester and an aqueous solution of boric acid. This boric acid is then heated with the second portion of the dialkyl borate to form the alkyl metaborate which is recycled to the first step of the process.

---

This invention relates to a process for the preparation of esters of carboxylic acids. More particularly the invention is concerned with a cyclic process for preparing esters of carboxylic acids in a series of steps whereby a portion of the starting materials are recovered and recycled, after use thereof, to the first step of the process.

Esters of organic acids, both mono- and diesters in configuration, are finding a wide variety of uses in the chemical field. For example, the sec-alkyl esters which are prepared according to the process hereinafter set forth in greater detail may be used as plasticizers for resins, polymers, plastics, etc. Specific examples of these esters will include di-sec-octyl sebacate, di-sec-decyl sebacate, sec-octyl laurates, sec-decyl laurates, sec-dodecyl laurates, etc. It is to be understod that the aforementioned esters are only representative of the number of esters which are used in the chemical and allied fields.

It is therefore an object of this invention to provide a process for preparing esters of carboxylic acids.

A further object of this invention is to provide a cyclic process for the esterification of carboxylic acids whereby a portion of the starting materials may be recovered and recycled after use thereof in the process.

In one aspect an embodiment of this invention resides in a cyclic process for the production of an ester of a carboxylic acid which comprises:

(a) Heating a saturated hydrocarbon with an oxygen-containing gas in the presence of the corresponding alkyl metaborate to form a dialkyl borate, (b) Dividing the resultant dialkyl borate into two portions, (c) Treating the first portion of said dialkyl borate with a carboxylic acid in the presence of an acidic catalyst, (d) Treating the resultant compound with water to form the desired ester and an aqueous solution of boric acid, (e) Recovering the desired ester, (f) Treating the second portion of said dialkyl borate with said aqueous solution of boric acid to reform the alkyl metaborate, and (g) Recycling said alkyl metaborate to the first step of said process.

A specific embodiment of this invention is found in a cyclic process for the production of an ester of a carboxylic acid which comprises heating dodecane with air in the presence of dodecyl metaborate at a temperature in the range of from about 100° to about 250° C. to yield didodecyl borate, dividing said didodecyl borate into two portions, treating the first portion of said borate with sebacic acid at a temperature in the range of from about ambient to about 200° C. in the presence of ethanesulfonic acid, treating the resultant product with water to form didodecyl sebacate and an aqueous solution of boric acid, recovering the desired didodecyl sebacate, treating the second portion of said didodecyl borate with the aqueous solution of boric acid to form dodecyl metaborate, and recycling said dodecyl metaborate to the first step of said process.

Other objects and embodiments will be found in the following further detailed description of the present invention.

The present invention, as hereinbefore set forth, is directed to a cyclic process for preparing esters of carboxylic acids, and particularly alkyl esters of carboxylic acids. The process is effected by reacting a mixture of a saturated hydrocarbon, and particularly a paraffinic hydrocarbon containing from 3 up to about 20 carbon atoms or more with the corresponding alkyl metaborate in the presence of an oxygen-containing gas to form a dialkyl borate. Specific examples of the paraffinic hydrocarbons which may be used include those preferably containing from 5 up to about 20 carbon atoms or more such as n-pentane, n-hexane, n-heptane, n-octane, n-nonane, n-decane, n-undecane, n-dodecane, n-tridecane, n-tetradecane, n-pentadecane, n-hexadecane, n-heptadecane, n-octadecane, n-nonadecane, and neicosane, although it is also contemplated within the scope of this invention that propane and butane may also be used if varying conditions of temperature and pressure are utilized. While the process of this invention is particularly applicable to n-alkanes, it may also be used with cycloalkanes (either unsubstituted or alkyl-substituted) and with branched-chain alkanes, but not necessarily with equivalent results.

The corresponding metaborates which are reacted with the saturated hydrocarbon will include propyl metaborates, butyl metaborates, pentyl metaborates, hexyl metaborates, heptyl metaborates, octyl metaborates, nonyl metaborates, decyl metaborates, undecyl metaborates, dodecyl metaborates, tridecyl metaborates, tetradecyl metaborates, pentadecyl metaborates, hexadecyl metaborates, heptadecyl metaborates, octadecyl metaborates, nonadecyl metaborates, eicosyl metaborates, etc., in each case including both n- and sec-alkyl metaborates. Metaborates are herein defined as alkylborates in which the alkyl:boron ratio is approximately one.

The aforementioned paraffinic hydrocarbons and alkyl metaborates are reacted in the presence of an oxygen-containing gas such as air, oxygen, etc. to form the dialkylborate, i.e. borate esters in which the ratio of alkyl groups to boron is approximately two. The reaction between the paraffinic hydrocarbon and the corresponding alkyl metaborate is effected at reaction conditions which include a temperature in the range of from about 100° to about 250° C. or more and at pressures ranging from atmospheric up to about 100 atmospheres or more. When utilizing a normally gaseous paraffin and the corresponding alkyl metaborate it will be necessary to utilize superatmospheric pressures, the amount of pressure being that which is necessary to maintain a major portion of the reactants in the liquid phase. Such pressure may be provided by an inert diluent gas such as nitrogen to the reaction zone.

Following the formation of the dialkyl borate the product is divided into two portions. One portion of the dialkyl borate is then used as an esterification agent in the treatment of a carboxylic acid. The suitable carboxylic acids which undergo esterification according to the process described herein will include mono-, and di- and polycarboxylic acids, both saturated and unsaturated. Specific examples of these acids will include the fatty acids such as acetic acid, propionic acid, butyric acid, valeric acid, enanthylic acid, caprylic acid, pelargonic acid, capric acid, undecylic acid, lauric acid, tridecanoic acid, myristic acid, pentadecanoic acid, palmitic acid, margaric acid, stearic acid, nonadecylic acid, arachidic acid, behenic acid, carnaubic acid, etc.; oxalic acid, malonic acid, succinic acid, glutaric acid, adipic acid, pimelic acid, suberic acid, azelaic acid, sebacic acid, brassic acid, brassilic acid, roccelic acid, etc.; aromatic acids such as benzoic acid, o-toluic acid, m-toluic acid, p-toluic acid, phthalic acid, isophthalic acid, terephthalic acid, etc.; cyclopentanecarboxylic acid, cyclohexanecarboxylic acid, cycloheptanecarboxylic acid, etc. It is also contemplated within the scope of this invention that unsaturated carboxylic acids may also be used but not necessarily with equivalent results. Some specific examples of these acids will include the acrylic acid series such as acrylic acid, crotonic acid, isocrotonic acid, vinylacetic acid, methylacrylic acid, tiglic acid, angelic acid, senecioic acid, hypogaeic acid, oleic acid, etc., fumaric acid, maleic acid, glutaconic acid, citraconic acid, itaconic acid, methylenemalonic acid, ethylidenemalonic acid, mesaconic acid, allylmalonic acid, propylidenemalonic acid, hydromuconic acid, allylsuccinic acid, etc.; chloroacetic acid, bromoacetic aid, iodoacetic acid, chloropropionic acid, bromobutyric acid, iodovaleric acid, chlorocaproic acid, bromocaprylic acid, iodocapric acid, lactic acid, etc.

The esterification conditions under which the process of the present invention is effected will include temperatures in the range of from ambient (25° C.) up to about 200° C. or more and at a pressure in the range of from atmospheric up to about 100 atmospheres, the amount of pressure which is used being that which is sufficient to maintain a major portion of the reactants in the liquid phase. When superatmospheric pressures are used the pressure may be provided for by the introduction of an inert gas such as nitrogen into the reaction zone.

In addition, the esterification is also effected in the presence of an acidic catalyst. The acidic catalyst may comprise an inorganic acid such as sulfuric acid, phosphoric acid, etc.; an organic acid such as methanesulfonic acid, ethanesulfonic acid, propanesulfonic acid, butanesulfonic acid, benzenesulfonic acid, toluenesulfonic acid, etc.; or other substances which are acid acting in nature such as boron trifluoride, boron trifluoride etherate, alumina-silica, crystalline alumina-silica complexes, etc. Following the reaction of the carboxylic acid with the dialkylborate, the resulting compound is then treated with water to yield the desired ester and an aqueous solution of boric acid.

The second portion of the dialkylborate which was formed according to the first step of the present process is thereafter admixed with the aqueous solution of boric acid, and a low boiling alkane such as pentane, hexane, etc. which is utilized to azeotrope off the water, to form the alkyl metaborate. The alkyl metaborate thus formed will be recycled to the first step of the process for use as a feed material to react with the paraffinic hydrocarbon and the oxygen-containing gas.

The process of this invention may be effected in any suitable manner and may comprise either a batch or continuous type operation. For example, when a batch type operation is used, a saturated hydrocarbon such as, for example, dodecane is placed in an appropriate apparatus such as, for example, a rotating autoclave along with the corresponding alkyl metaborate such as dodecyl metaborate. The autoclave is sealed and an oxygen-containing gas such as air or oxygen is charged thereto until the desired pressure is reached. The autoclave is then heated to the desired temperature and maintained thereat for a predetermined residence time which may be in the range of from about 0.5 up to about 10 hours or more in duration. At the end of this time, the product is recovered after allowing the autoclave to cool to room temperature and venting the excess pressure. The desired product comprising didodecyl borate, which has been selectively formed by oxidation of dodecane in the presence of the metaborate, is separated from unreacted starting materials by conventional means and divided into equal portions. One-half of the didodecyl borate is placed in an appropriate esterification apparatus along with a catalytic amount of an acidic catalyst. An appropriate carboxylic acid such as, for example, acetic acid is placed in the esterification apparatus and is allowed to react at a temperature in the range hereinbefore set forth in greater detail. The dialkylborate and the carboxylic acid are present in a mole ratio of from about 1:2 up to about 1.5:1 moles of dialkylborate per mole of carboxylic acid, the molecular proportions of the reactants being dependent upon whether the carboxylic acid contains 1, 2, or more acid radicals, an approximately equivalent ratio being maintained between the number of alkyl groups available and the number of carboxylic acid groups, preferably with some excess of the latter. Upon completion of the desired residence time which may range from about 0.5 up to about 5 hours or more the resultant product is treated with water. The reaction mixture will separate into an aqueous layer and an organic layer, the former being an aqueous solution of boric acid, while the latter comprises the desired ester of the carboxylic acid which, in this instance, comprises dodecyl acetate.

The two layers are separated by conventional means and the aqueous boric acid solution is then added to an apparatus which contains the second portion of the dialkylborate which was formed in the first step of the process. In addition, the apparatus, which is provided with water removal means such as a Dean-Stark trap, also contains a low-boiling alkane such as n-pentane. The flask is heated to the reflux temperature of the mixture and allowed to reflux for a predetermined period of time during which the water will be azeotroped off. When no more water is azeotroped off the reaction is discontinued, and the alkyl metaborate which has formed is recovered after separation from any unreacted starting and azeotroping materials and utilized as the feed stock in the first step of this process.

It is also contemplated within the scope of this invention that the process may be effected in a continuous manner of operation. When such a type of operation is used, the reactants comprising the saturated hydrocarbon and the corresponding alkyl metaborate are continuously charged to a reaction zone which is maintained at the proper operating conditions of temperature and pressure. In addition, air, or an oxygen-containing gas is continuously charged to the reaction zone through separate means. After completion of the desired residence time the reactor effluent is continuously withdrawn and the dialkylborate which is formed is separated from any unreacted starting materials, the latter being recycled to the first reaction zone. The desired dialkylborate is then divided into two portions, the first portion being charged to a second reaction zone which is also maintained at the proper operating conditions of temperature and pressure. This second reaction zone will contain an acidic catalyst of the type hereinbefore set forth. When utilizing a catalyst which is in a solid form, such as alumina-silica, the reaction may be effected in a fixed bed type of operation. The carboxylic acid which is to undergo esterification is also continuously charged to the reaction zone through a separate line. Conversely speaking, when the catalyst is in liquid form it may be charged to this reaction zone through separate means or, if so desired, it may be admixed with one or both of the reactants and charged to said reaction zone in a single stream. The reaction product is continuously withdrawn from the second reaction zone and charged to a third reaction zone along with a sufficient amount of water to prepare an aqueous solution of boric acid. The reactor effluent is continuously withdrawn from this third reaction zone, and is separated by conventional means into the desired ester, which is recovered, and the aqueous solution of boric acid. This aqueous solution of boric acid is continuously charged to yet another reaction zone to which the second portion of the dialkylborate formed in the first step has been previously charged. In this fourth reaction zone the aqueous solution of boric acid and the dialkylborate are reacted to form alkyl metaborate in the presence of a low boiling inert hydrocarbon, said hydrocarbon being present to azeotrope off the water which is formed. The resultant alkyl metaborate which is formed in the fourth reaction zone is continuously withdrawn and, after separation from any residual azeotroping hydrocarbon, is continuously charged to the first reaction zone as one of the reactants therein.

Some specific examples of esters of carboxylic acids which may be prepared according to the process of this invention will include isopropyl acetate, sec-amyl acetates, sec-hexyl acetate, sec-butyl propionate, isopropyl butyrate, isopropyl caproate, sec-butyl caproate, sec-butyl caprylate, isopropyl pelargonate, sec-butyl caprate, sec-hexyl laurate, sec-butyl oxalate, isopropyl malonate, sec-butyl succinate, sec-amyl adipates, sec-decyl pimelates, sec-hexyl sebacates, sec-octyl sebacates, sec-decyl sebacates, sec-octyl laurates, sec-decyl laurates, sec-hexyl brassates, sec-octyl benzoates, sec-dodecyl toluates, etc. It is to be understood that the aforementioned esters of carboxylic acids are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 7 moles of dodecane are placed in a glass liner of a rotating autoclave along with 1 mole of dodecyl metaborate. Air is pressed in until an initial pressure of 25 atmospheres is reached, following which the autoclave is heated to a temperature of about 160° C. The autoclave and contents thereof are maintained at this temperature for a period of about 4 hours, at the end of which time the autoclave and contents thereof are allowed to return to room temperature. The autoclave is vented to remove excess pressure and opened. The reaction mixture is recovered and the desired didodecyl borate is separated from the unreacted dodecane (approximately six moles) by means of fractional distillation. Half of this didodecyl borate is then treated with 0.5 molecular proportion of sebacic acid utilizing ethane-sulfonic acid as the catalyst. The mixture is placed in a flask and heated to a temperature of about 75° C. The reaction mixture is maintained at a temperature ranging from 75° C. to about 100° C. for a period of 4 hours, at the end of which time the solution (containing boric acid crystals) is cooled to room temperature and treated with enough water to dissolve the boric acid, the mixture separating into an aqueous layer and an organic layer. The organic layer is separated from the aqueous layer by decantation and the desired product comprising didodecyl sebacate is recovered in relatively pure form. The aqueous layer of the mixture which comprises an aqueous solution of boric acid is then admixed with the second portion of the didodecyl borate in a flask provided with water-collecting means. In addition, a small amount of hexane is also present in the flask. The reaction is heated to reflux and the water which azeotropes off is collected in a Dean-Stark tube, hexane being returned to the flask. At the end of the reaction time which is reached when no more water azeotropes off hexane is removed overhead and the resulting dodecyl metaborate is recovered and utilized as the starting material in the first step of this process.

EXAMPLE II

In this example 7 moles of dodecane and 1 mole of dodecyl metaborate are treated in a manner similar to that set forth in Example I above, that is, by placing said compound in a rotating autoclave, adding air until an initial pressure of 25 atmospheres is reached and thereafter heating the autoclave to a temperature of about 150° C. for a period of about 4 hours to prepare didodecylborate. The didodecylborate after separation and purification thereof is divided into two equal portions. The first portion is treated with caproic acid in the presence of ethanesulfonic acid at a temperature of about 100° C. and the resulting product is treated with water. The resulting mixture, comprising an aqueous layer and an organic layer is separated and the desired dodecyl caproate is recovered. The aqueous layer comprising an aqueous solution of boric acid is reacted with the second portion of the didodecylborate which was prepared above in the presence of n-pentane, and after the water has been azeotroped off the resultant dodecyl metaborate is recovered and used in the first step of this process.

EXAMPLE III

In this example six moles of n-hexane and one mole of hexyl metaborate are placed in the glass liner of a rotating autoclave and oxygen diluted with nine times as much nitrogen is pressed in until an initial pressure of 30 atmospheres is reached. The autoclave is then heated to a temperature of about 150° C. and maintained thereat for a period of about 4 hours. At the end of this time, the autoclave and contents thereof are allowed to return to room temperature and the excess pressure is vented. The dihexylborate which has been formed and which is recovered from the first step of the process is divided into two equal portions. The first portion is placed in a condensation flask along with two molar portions of acetic acid and a catalytic amount of benzenesulfonic acid. After treatment at a temperature of about 100° C. the resulting product is treated with a sufficient amount of water to dissolve the precipitated boric acid. The reaction mixture which comprises an aqueous layer and an organic layer is separated by conventional means and the desired product comprising hexyl acetate is recovered. The aqueous portion of the mixture which comprises an aqueous solution of boric acid is used to treat the second half of the dihexylborate which was prepared in step one of this process. The treatment is effected by placing the aqueous solution of boric acid and the dihexyl metaborate in a flask provided with water-collecting means. After heating the reaction mixture at the reflux temperature of hexane, which is used to azeotrope off the water, the resulting hexyl metaborate is recovered and used as the reactant in the first step of this process, residual hexane likewise comprising part of the feed.

EXAMPLE IV

A mixture of several molecular portions of n-hexane and hexyl metaborate is treated with air in a manner similar to that set forth in the above examples. The resultant dihexylborate is recovered and separated into two equal portions. One portion of this dihexylborate is condensed with an equal molar portion of butyric acid in a condensation flask using ethanesulfonic acid as the catalyst. After allowing the condensation to proceed for a predetermined period of time the mixture is treated with water with the resultant formation of two layers, one an aqueous layer and the other an organic liquid layer. The organic liquid layer which comprises the desired hexyl butyrate is separated from the aqueous layer and recovered. The aqueous layer of the reaction mixture which comprises an aqueous solution of boric acid is reacted with the second portion of the dihexylborate in a flask provided with water-collecting means, using n-hexane as the azeotroping agent. The hexyl metaborate resulting from this step is recycled and used as a portion of the feed stock in the first step of said process.

EXAMPLE V

In this example octane and octyl metaborate are treated with air in a manner similar to that hereinbefore set forth. Upon completion of the desired residence time the autoclave is cooled and allowed to return to room temperature. The excess pressure is vented and the desired dioctylborate is separated from the unreacted starting materials and recovered. The dioctylborate is then divided into two equal portions, the first portion of which is condensed with propionic acid in a condensation flask using toluenesulfonic acid as the catalyst therefore, said reaction being effected at a temperature of about 100° C. for a period of about 4 hours. At the end of the residence time, the product is treated with water in a sufficient amount to dissolve the precipitated boric acid. The octyl propionate which is the organic liquid layer is separated from the aqueous layer by conventional means and recovered. The aqueous layer of the solution which contains boric acid is reacted with the second portion of the dioctylborate in a flask provided with water-collecting means using n-octane as the azeotroping agent. After the water has stopped collecting, the desired octyl metaborate is used as a reactant in step one of this process, being recycled with excess n-octane.

We claim as our invention:

1. A cyclic process for the production of an ester of a carboxylic acid which comprises:
    (a) heating a paraffinic hydrocarbon of from 3 to about 20 carbon atoms with an oxygen-containing gas in the presence of the corresponding alkyl metaborate at a temperature of about 100° C. to 250° C. to form a dialkylborate,
    (b) dividing the resultant dialkylborate into two portions,
    (c) treating the first portion of said dialkylborate with a stoichiometric proportion of a carboxylic acid in the presence of an acidic catalyst at a temperature of about ambient to 200° C.,
    (d) treating the resultant compound with water to form the desired ester and an aqueous solution of boric acid,
    (e) recovering the desired ester,
    (f) treating the second portion of said dialkylborate with said aqueous solution of boric acid to reform the alkyl metaborate, and
    (g) recycling said alkyl metaborate to the first step of said process.

2. The process as set forth in claim 1, further characterized in that said paraffinic hydrocarbon is an n-alkane.

3. The process as set forth in claim 1, further characterized in that said paraffinic hydrocarbon is hexane and said alkyl metaborate is hexyl metaborate.

4. The process as set forth in claim 1, further characterized in that said paraffinic hydrocarbon is octane and said alkyl metaborate is octyl metaborate.

5. The process as set forth in claim 1, further characterized in that said paraffinic hydrocarbon is dodecane and said alkyl metaborate is dodecyl metaborate.

6. The process as set forth in claim 3, further characterized in that said carboxylic acid is acetic acid and said ester is hexyl acetate.

7. The process as set forth in claim 3, further characterized in that said carboxylic acid is butyric acid and said ester is hexyl butyrate.

8. The process as set forth in claim 4, further characterized in that said carboxylic acid is propionic acid and said ester is octyl propionate.

9. The process as set forth in claim 4, further characterized in that said carboxylic acid is caproic acid and said ester is dodecyl caproate.

10. The process as set forth in claim 5, further characterized in that said carboxylic acid is sebacic acid and said ester is didodecyl sebacate.

References Cited
UNITED STATES PATENTS

| | | | |
|---|---|---|---|
| 3,346,614 | 10/1967 | Starks et al. | 260—462 |
| 3,375,265 | 3/1968 | Fetterly et al. | 260—462 |
| 3,410,913 | 11/1968 | McMahon et al. | 260—462 |

OTHER REFERENCES

Hirao et al., Chem. Abstracts, 49, p. 11593 (1955).

Lappert, J. Chem. Society, pp. 3256, 3257, 3259 (1958).

Steinberg, Organoboron Chemistry, pp. 123, 137, 330, 331, 445–447, 454, 459 (1964).

LORRAINE A. WEINBERGER, Primary Examiner

E. J. SKELLY, Assistant Examiner

U.S. Cl. X.R.

260—410.9, 462, 468, 475, 476, 484, 486, 487, 491